Patented Dec. 4, 1951

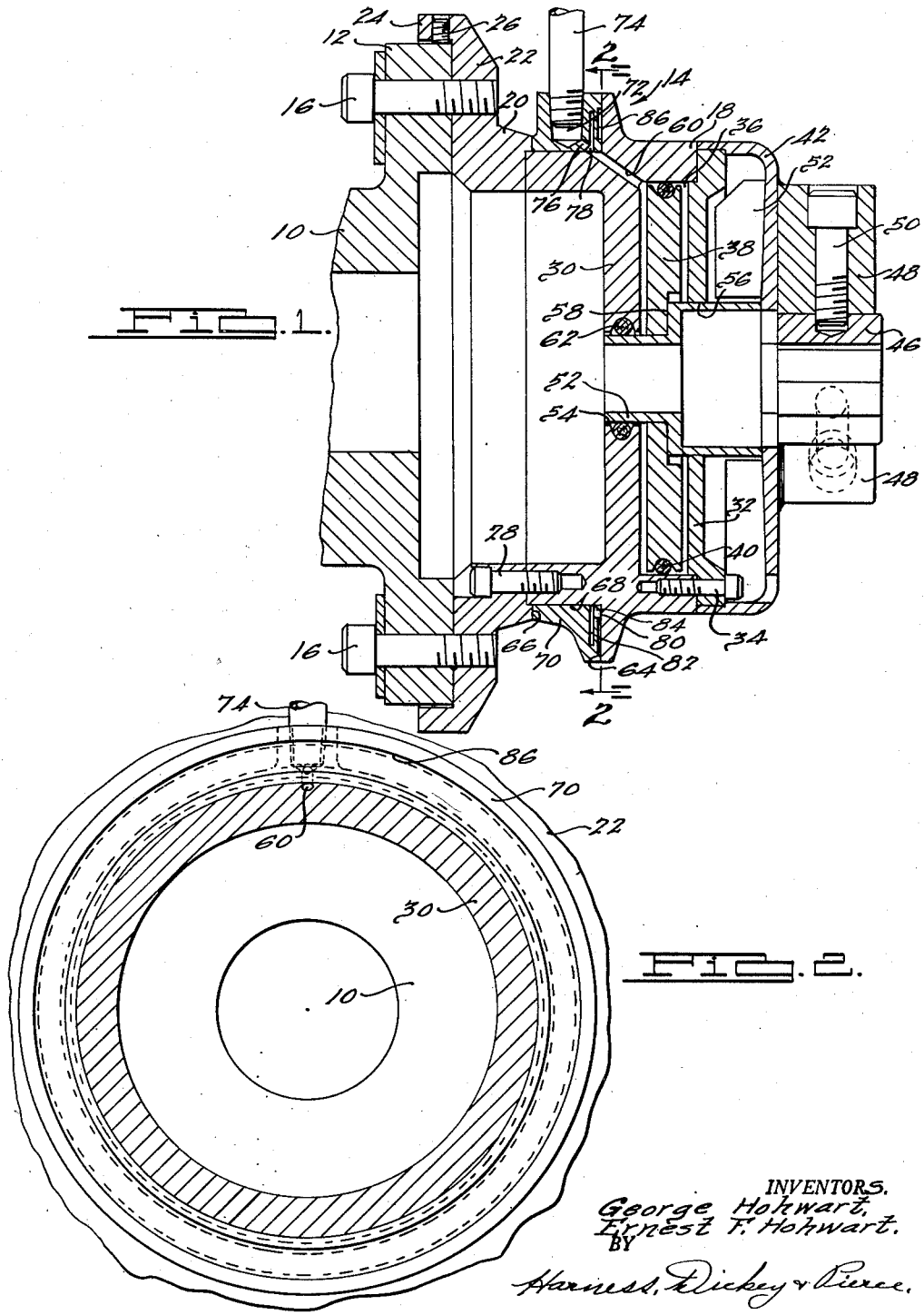

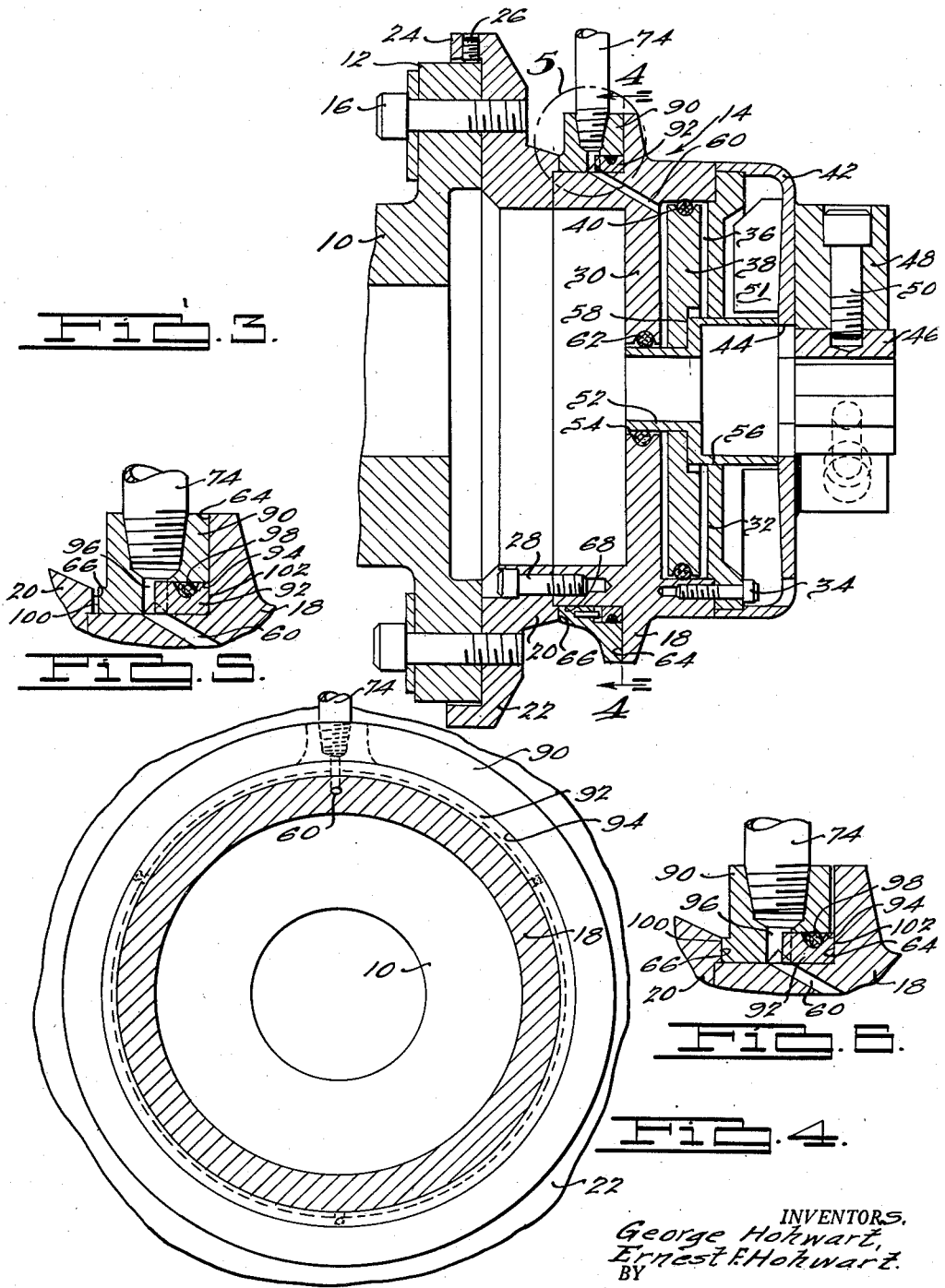

2,577,656

UNITED STATES PATENT OFFICE 2,577,656

DIAPHRAGM CHUCK

George Hohwart and Ernest F. Hohwart, Detroit, Mich., assignors to N. A. Woodworth Company, Ferndale, Mich., a corporation of Michigan Application November 4, 1949, Serial No. 125,606

9 Claims. (Cl. 279—46)

1

This invention relates broadly to slip rings for sealing relatively rotatable parts against fluid pressure and more particularly to a diaphragm chuck which includes a slip ring of this character and is uniquely constructed so that operating air can be introduced radially into the chuck body.

This application is a continuation, in part, of my copending application Serial No. 58,875, filed November 8, 1948, now abandoned.

An important object of the present invention is to provide a novel means for sealing relatively rotatable parts against fluid pressure.

Another object of the invention is to provide means of the above-mentioned character that normally offers little resistance to rotation of the parts whereby to minimize friction losses and wear between the parts.

Still another object of the invention is to provide a novel sealing means that not only seals the relatively rotating parts but also acts as a brake in response to fluid pressure to check rotation of the parts.

Yet another object of the invention is to provide a sealing ring of the above-mentioned character that is primarily adapted and pre-eminently suited for diaphragm chucks of the type wherein the work must extend through the center of the chuck or even into and through the machine spindle on which the chuck is mounted.

A further object of the invention is to provide a sealing ring of the above-mentioned character that can be used on substantially any type of air-operated chuck or equivalent device.

A still further object of the invention is to provide a diaphragm chuck in which operating air can be introduced radially into the chuck assembly.

Other objects and advantages of the invention will be apparent during the course of the following description.

In the drawings forming a part of this specification and wherein like numerals are employed to designate like parts throughout the same:

Fig. 1 is a longitudinal sectional view through a diaphragm chuck and showing the same constructed to accommodate a sealing ring embodying the present invention;

Fig. 2 is a transverse sectional view taken on the line 2—2 of Fig. 1;

Fig. 3 is a longitudinal sectional view similar to Fig. 1 but showing a modified sealing ring embodying the invention;

2

Fig. 4 is a transverse sectional view taken on the line 4—4 of Fig. 3;

Fig. 5 is an enlarged sectional view of the portion of Fig. 3 enclosed in the circle 5 showing the sealing ring positioned to release the chuck; and Fig. 6 is a view similar to Fig. 5 but showing the sealing ring positioned to engage the chuck.

In the drawings the invention is shown embodied, by way of illustration, in a diaphragm chuck of the general type shown in our copending application Serial No. 683,458, which was filed July 13, 1946, now Patent Number 2,491,611, issued December 20, 1949, although, in the construction shown, the chuck is modified somewhat to accommodate an airfeed slip ring and to permit the work to extend back into the chuck and spindle. This type of installation is necessary when the workpiece has a long projection that must be accommodated behind the gripping jaws of the chuck. For example, so-called long-drive pinions are formed with a relatively long shaft, and the pinion is desirably mounted in the chuck with the shaft extending back into the chuck. Further, when the work is tubular or bar stock, it may extend entirely through the chuck or even into and through the spindle on which the chuck is mounted.

In installations of the type hereinabove described, operating air cannot be fed to the chuck through the center of the spindle as shown in our prior application. If the chuck is to be operated by air, the air of necessity must be supplied through the outside diameter of the chuck. Moreover, the air connection must be such as to leave the front face of the chuck clear for the work and the tools which operate on the work.

Heretofore considerable difficulty has been encountered in supplying air radially into the chuck, since the latter rotates rapidly in use and it is necessary to maintain an essentially tight seal at all times between the connection and the chuck body. For practical reasons, the air connection must not appreciably brake or check rotation of the chuck while the latter is rotatably driven. Also, a connection would be unsatisfactory from a practical standpoint if excessive wear occurred between the parts so as to require constant repair or replacement of parts in order to maintain a tight seal between the connection and the chuck body. All in all, the problem of supplying operating air to the chuck without interference from that portion of the work which extends back into the chuck and driving spindle, without interfering with the tools which operate on the work, and without checking or appreciably retarding the rotational speed of the chuck or resulting in excessive wear of parts has been a very real one in this art.

The diaphragm chuck here shown has a tubular spindle 10, and the spindle is provided at the forward end thereof with a radial flange 12. A chuck body 14 is fastened to the flange by screws 16. According to the present invention, the chuck body 14 is formed in two separable front and rear sections 18 and 20. The rear section 20 is generally annular in shape and is formed at the rearward end thereof with a radial flange 22 which receives the fastening screws 16. At the periphery of flange 22 is a rearwardly projecting annular lip 24 which surrounds the periphery of spindle flange 12. An annular series of radially disposed set screws 26 carried by the lip 24 engage the flange 12 at angularly or circumferentially spaced points and provide means for centering the chuck precisely on the spindle. The front section 18 also is generally annular in shape, and the rearward edge thereof abuts against the forward edge of the rear section 20, as shown in Fig. 1. An annular series of screws 28 fasten the two sections 18 and 20 together.

Intermediate its ends the front section 18 is formed with a radial partition 30 and the usual backing plate 32 is fastened to the forward end thereof by screws 34. It will be observed that the partition 30 and backing plate 32 are spaced axially on the chuck body, and these two elements cooperate to define a cylinder 36. A piston 38 is slidably mounted in the cylinder 36, and an O ring 40 on the periphery of the piston effects a seal between the piston and the surrounding cylinder wall.

A generally cup-shaped diaphragm 42 fits over the periphery of backing plate 32 and preferably is welded or brazed thereto. The diaphragm 42 is formed with a central opening 44, and a plurality of work-clamping jaws 46 are arranged concentrically around the opening. The jaws 46 are carried by respective back-up blocks 48 which are welded or otherwise fastened to the diaphragm 42, and screws 50 fasten the jaws to the blocks. Counterweights 51 are provided on the rear of the diaphragm 42 according to conventional practice.

A tube 52 is mounted for limited sliding movement in aligned openings 54 and 56 which are provided substantially centrally in the partition 30 and backing plate 32 respectively. Thus the tubular member 52 extends entirely through the cylinder 36, and it will be observed that the portion thereof within the cylinder is formed to provide a rearwardly facing radial shoulder 58 which abuts against the forward face of piston 38. Air under pressure is supplied to the cylinder 36 behind piston 38 through a passage 60, and an O ring 62 seals the annular space between partition 30 and the tube 52. At its forward end the tube 52 abuts against the diaphragm 42 around the central opening 44. Thus the tube 52 serves to transmit force axially between the piston 38 and the diaphragm 42.

In practice, the diaphragm 42 normally positions the jaws 46 to clamp the work. In order to release the work, force is applied to advance piston 38, and the piston acts through tubular member 52 to flex the diaphragm forwardly. Flexure of the diaphragm in this manner releases the jaws 46 from the work so that the latter can be removed from the chuck. Also, it will be readily apparent that it is necessary to move the jaws 46 to work-releasing position in order to insert a workpiece in the chuck. This procedure for chucking a workpiece and for operating the jaws of the chuck is conventional and forms no part of the present invention.

Operating air is delivered to the supply passage 60 through a novel slip-ring connection embodying the present invention. In this connection it will be observed that the front and rear sections of the chuck body 14 are formed substantially at the juncture thereof with external radial shoulders 64 and 66 which, together with the intervening peripheral surface 68 of the front section 18, define an external annular groove in the chuck body. Also, it will be observed that the outer end of air passage 60 opens into the groove adjacent the forward wall 64.

An air-feed slip ring 70 mounted in the groove affords a connection between a suitable source of air under pressure and the air passage 60. The ring 70 is provided with an air inlet 72 which threadedly receives an air-supply pipe 74 which delivers air under pressure to the chuck from a suitable source (not shown). A port 76 in the ring 70 provides communication between the air inlet 72 and the passage 60, and an annular groove 78 extends around the inner surface of the ring at the juncture of the port 76, and the passage 60 from the supply pipe 74 has free access to the cylinder 36.

Manifestly, pipe 74 holds the ring 70 stationary at all times during operation of the chuck, and the ring 70 therefor is made to have a running fit both axially and radially so as to reduce to a minimum any frictional resistance between the ring and the chuck body 14. The slip ring 70 preferably is made of high-grade bronze, although it can be made of any suitable, nonferrous, springlike metal having good wearing qualities.

In order to prevent running clearances between ring 70 and chuck body 14 from causing excessive escape of air, the ring is formed adjacent the side 80 thereof with a relatively deep, narrow, radial groove 82 which opens onto the inner annular face of the ring and into the annular groove 78. The groove 82 defines a thin, inherently flexible wall section 84 between the groove and the adjacent side 80 of the ring. Further, in order to increase the flexibility of the wall section 84, the flat side wall 80 of the ring is undercut, as at 86. It will be observed that the undercut portion 86 is centrally located in and extends over approximately half the width of the surface 80. Also, the undercut 86 is sufficiently deep to reduce the thickness of the wall section 84 by approximately one-half.

Thus, air under pressure supplied to the chuck enters the groove 82 and exerts pressure against the inner face of the wall section 84. By reason of its inherently flexible nature, the wall section 84 is pressed outwardly against the chuck body by fluid pressure within the groove 82. Lateral flexing of the wall section 84 in effect expands the ring 70 and effects pressed frictional engagement between both sides of the ring and the adjacent radial walls or shoulders 64 and 66. The result is a diaphragm seal action between the ring and the chuck body which effectively prevents excessive leakage of air around the ring. Moreover, the sealing action thus obtained is proportional to the air pressure applied. In other words, the sealing action becomes progressively greater as the air pressure in groove 82 increases.

In connection with the foregoing, it should be noted that some air does escape around the ring 70, but the amount of air lost in this manner is not sufficient to affect the air pressure in the cylinder 36 to any appreciable extent. As a matter of fact, we have found that the slight amount of air which does escape around the ring 70 keeps joints between the relatively moving parts clean at all times. This is particularly beneficial in a device of this character which frequently is used to hold work for grinding or other operations which create a great deal of dust and grit.

In operation, air is supplied under pressure to the air inlet 72 and thence enters the cylinder 36 behind piston 38 through port 76, annular groove 78, and passage 80. Air pressure in the cylinder 36 advances piston 38 and the latter acts against the diaphragm 42 through the tubular member 52 to move clamping jaws 48 to work-releasing positions. Air under pressure is supplied to the chuck only during loading or unloading of the work. No air is supplied during operation of the chuck. When the chuck is in operation, the free running fit between the air-feed ring 70 and the chuck body creates very little friction. Usually the air to the chuck is shut off before the work cycle begins so that the ring 70 offers little frictional resistance from the time the machine begins its cycle of operation.

At the end of the work cycle, the rotary drive is disengaged from spindle 10, and air pressure is turned on to release the work. During this portion of the operating cycle, the ring 70 serves a double function in the combination of providing a connection between the air-supply means and the chuck and also acts as a brake against the chuck body to check rotational speed of the latter so that the work can be removed relatively quickly. Normally the chuck continues to rotate due to inertia for a while after the drive to the spindle 10 has been disengaged, and it is desirable to bring the chuck to an abrupt stop as soon as possible so as to shorten the unloading and loading time. In fact many high-speed production machines are equipped with automatic brakes for this very purpose. However, in the case of the present invention, an effective braking action is supplied by the air-feed slip ring 70. Moreover, the braking action is applied automatically and at exactly the proper moment in the operating cycle by the sealing action of the ring end faces against the side walls of the groove in the chuck body. Thus, as a result of the present construction, two vital synchronized actions, sealing and braking, are performed simultaneously by the slip ring 70.

The form of the invention shown in Figs. 3-6 is generally similar to the form hereinabove described, except that a modified slip ring 90 is substituted for the slip ring 70.

The ring 90 is generally similar in size and shape to the ring 70 and fits in a similar manner in the external groove defined by surfaces 64, 66, and 68. In the instant construction, however, the flexible wall section 84 is replaced by an annular movable wall or piston 92 which operates in a rabbet recess 94 in the ring 90. In this connection, it will be observed that the recess 94 opens inwardly and through one side of the ring 90. The piston 92 is normally spaced from the inner radial wall of the recess 94 to define an annular groove or chamber 96 which corresponds to the groove 78 in the first form of the invention. An O ring 98 seals the joint between the periphery of piston 92 and the confronting axial or circumferential surface of recess 94. The ring 98 prevents air or other fluid under pressure from leaking between the periphery of the piston 92 and the recess 94 and at the same time permits the piston to be freely movable laterally in the recess. The inner axial surface of piston 92 preferably extends flush with the inner axial surface of ring 90 as clearly shown in the drawings so that the ring assembly fits properly in the chuck. The pipe 74 is connected to the slip ring 90 as in the form of the invention first described, and the pipe similarly introduces air or other fluid under pressure into the chamber 96 for operation of the chuck. It will be readily apparent that the external radial surface 100 of the ring 90 and the external radial surface 102 of the piston 92 constitute pressure surfaces arranged to engage the radial walls 64 and 66 of the chuck to brake the latter when it is desired to stop the chuck and remove the work.

In normal operation, the surfaces 100 and 102 are released from their respective confronting surfaces 66 and 65 so as to provide a loose running fit between the slip-ring assembly and the chuck (Fig. 5). However, when air under pressure is introduced in to the chuck through pipe 74 to release the work, the slip-ring assembly operates substantially in the same manner as in the form of the invention first described to brake or check rotation of the chuck. Air under pressure in chamber 96 acts against the inner radial face of piston 92 and urges the latter laterally from recess 94 to the position shown in Fig 6 and presses the outer radial surfaces 100 and 102 solidly against the confronting surfaces 66 and 64 to check rotation of the chuck.

In connection with the foregoing, it should be pointed out that the O ring 98 serves a double function in the combination of sealing the joint between the piston 92 and the sealing ring 90 and also of retracting the piston 92 from the extended position shown in Fig. 6 substantially immediately when the fluid pressure in chamber 96 is relieved. When piston 92 is retracted as shown in Fig. 5, O ring 98 is generally symmetrical in cross section. However, when the piston is advanced as shown in Fig. 6, the O ring is distorted into an oblong, cross-sectional shape as shown in the drawings. This phenomenon occurs because the piston travel is relatively short, and movement of the piston is accommodated substantially entirely by flexure of the O ring 98. In practice, very little, if any, slippage occurs between the O ring 98 and the confronting axial wall of the rabbet recess 94. Internal stresses thus created in O ring 98 when the piston 92 advances act to retract the piston immediately when pressure thereon is released.

It will be readily apparent that all of the advantages hereinabove described in connection with the preferred form of the invention also obtain for the modified construction last described.

Having thus described the invention, we claim:

1. In combination with a machine having relatively rotatable parts, an annular groove at the juncture of said parts and each part defining a radial side wall of said groove, a ring in said groove normally having a running fit with said side walls, said ring having a laterally flexible portion, a fluid chamber behind said portion, and a fluid inlet for said chamber, and means for introducing fluid under pressure into said chamber, whereby fluid pressure in the chamber flexes the flexible portion laterally outwardly against the adjacent side wall of the groove to effect a sealing frictional engagement between said ring and the side walls of said groove.

2. In combination with a machine having relatively rotatable parts provided with confronting radial shoulders, a ring between and having a running fit with said shoulders to permit relatively easy rotation between the rotatable and stationary parts, said ring having a radial groove disposed in close proximity to one side wall thereof and said groove defining a thin, essentially flexible, radial flange, and means for introducing fluid under pressure into said groove whereby to flex said flange laterally against the adjacent shoulder to assure a sealing frictional engagement between the ring and said shoulder.

3. In combination with a machine having relatively rotatable parts, an annular groove at the juncture of said parts and each part defining a radial side wall of said groove, a ring in said groove normally having a running fit with said side walls to permit relatively easy rotation between the stationary and rotatable parts, said ring having an internal annular surface and provided with a channel extending radially outwardly from said surface, said channel disposed in close proximity to one side of the ring to define a thin, laterally flexible flange between the channel and the mentioned side of the ring, and means for introducing fluid under pressure into said channel, whereby to flex said flange laterally against the adjacent side wall of the groove and thus effect a substantially fluidtight seal between the ring and said parts.

4. In a machine, a pair of elements at least one of which is rotatable relative to the other, said elements having spaced, annular surfaces arranged in opposed relation and concentric to the axis of said rotatable element, fluid-actuated means having a fluid-supply duct opening between said annular surfaces, and a stationary ring mounted between and having a running fit with said annular surfaces, said ring provided with a fluid passage communicating with said supply duct and having a laterally flexible portion exposed to fluid in said passage and adapted to be flexed laterally into pressed frictional engagement with the adjacent annular surface by pressure fluid in the passage whereby to assure a sealing frictional engagement between the ring and the said annular surfaces.

5. In combination with a machine having relatively rotatable parts, an annular groove at the juncture of said parts and each part defining a radial side wall of said groove, a ring in said groove normally having a running fit with said side walls, said ring having a laterally movable wall, a fluid chamber behind said wall, and a fluid inlet for said chamber, and means for introducing fluid under pressure into said chamber, whereby fluid pressure in the chamber moves said wall laterally outwardly against the adjacent side wall of the groove to effect a sealing frictional engagement between said ring and the side walls of said groove.

6. A sealing ring having a radial surface at one side and an annular rabbet recess opening inwardly and through the opposite side thereof, an annular piston in said recess movable laterally from the recess and having an outer radial sealing surface, and resilient means sealing the joint between the periphery of the piston and the confronting wall of said recess, said resilient means normally holding said piston retracted in the recess and adapted to be flexed by movement of the piston laterally from the recess and operative to retract said piston to its initial position as soon as force tending to advance the piston is relieved.

7. A ring having an outer radial sealing surface and an annular groove, a laterally movable annular wall forming one side of the groove and having an outer radial sealing surface on the side of the ring remote from said first-mentioned sealing surface, and resilient means between the ring and said wall, said resilient means adapted to be tensioned when said wall is moved laterally in the ring and operable to return the wall to its initial position as soon as pressure against the wall is relieved.

8. A sealing ring having a radial sealing surface at one side and an annular rabbet recess opening inwardly and through the opposite side thereof, a piston in said recess movable laterally from the recess and having an outer radial sealing surface, and means sealing the joint between the periphery of the piston and the confronting wall of said recess.

9. A ring having an outer radial sealing surface and an annular groove, a laterally movable annular wall forming one side of the groove and having an outer radial sealing surface at the side of the ring remote from said first-mentioned sealing surface, and means providing a fluidtight connection between the ring and said wall.

GEORGE HOHWART.
ERNEST F. HOHWART.

REFERENCES CITED

The following references are of record in the file of this patent:

UNITED STATES PATENTS

| Number | Name | Date |
|---|---|---|
| 2,210,088 | Longfield | Aug. 6, 1940 |
| 2,230,881 | Browne | Feb. 4, 1941 |
| 2,383,084 | Walden | Aug. 21, 1945 |
| 2,400,658 | Shepherd | May 21, 1946 |
| 2,459,643 | Hartley | Jan. 18, 1949 |